T. B. McFADDEN.
APPARATUS FOR FORMING ICE IN FREEZING WEATHER.
No. 174,833. Patented March 14, 1876.
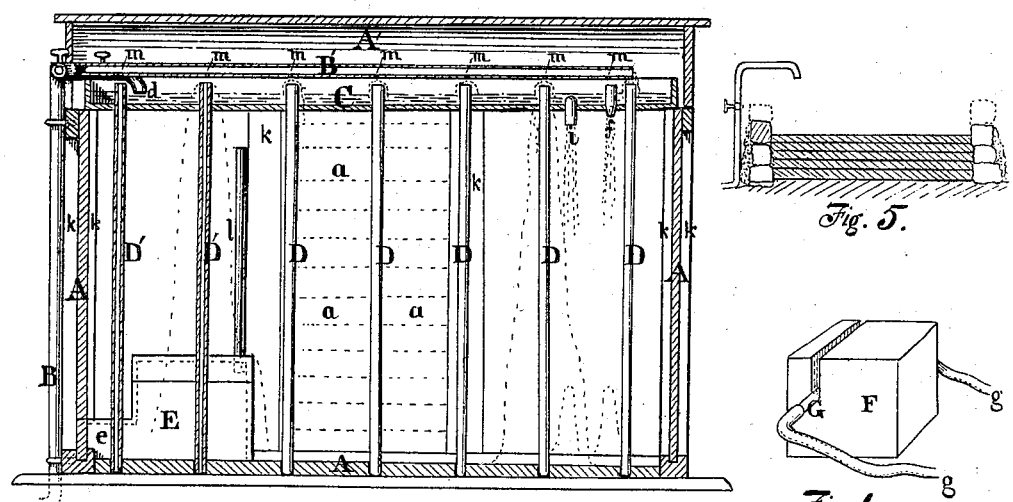
Fig. 1. (Ideal vert. sec. thro' Plan fig. 2.)
But shewing the poles "D" still in front of Trough C.
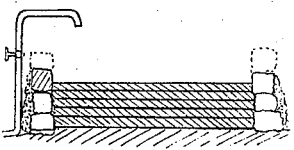
Fig. 5.
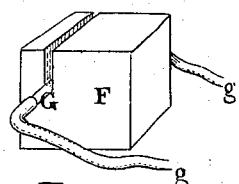
Fig. 4.
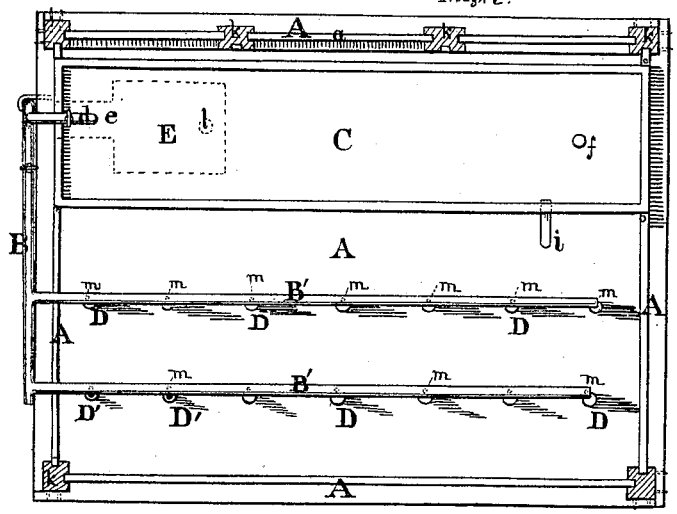
Fig. 2. (Plan of Ice-House)
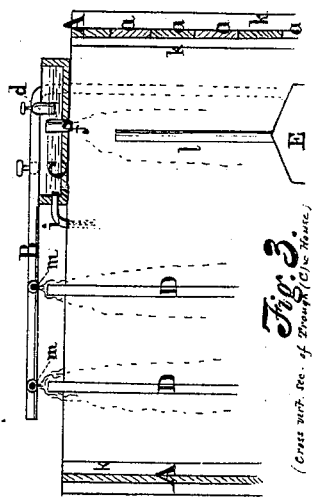
Fig. 3. (Cross vert. sec. of Trough C Ice House.)

UNITED STATES PATENT OFFICE.

THOMAS B. McFADDEN, OF PEORIA, ILLINOIS.

IMPROVEMENT IN APPARATUS FOR FORMING ICE IN FREEZING WEATHER.

Specification forming part of Letters Patent No. 174,833, dated March 14, 1876; application filed December 14, 1875.

*To all whom it may concern:*

Be it known that I, THOMAS B. MCFADDEN, of the city of Peoria, in the county of Peoria, in the State of Illinois, have invented a system of forming ice for ice-houses, cooling-rooms, and for preserving provisions, &c.; and do hereby declare that the following is a full, clear, and exact description thereof, reference being had to the annexed drawings, making a part of this specification, in which—

Figure 1 represents a vertical ideal section of ice-house, combined with a cooling-room; Fig. 2, a plan view of same, showing roof removed; Fig. 3, a vertical section seen from the right-hand end of Fig. 2; Fig. 4, a view of device for cutting the ice out, and Fig. 5 a view showing the forming of ice by strata.

Like letters in all the figures of the drawing indicate like parts.

My invention consists in devices constructed for the formation of ice in a natural freezing temperature. I conduct water in freezing weather along pipes or cooling-surfaces to form at several points deposits of ice, which, by continual increase and accretion, form one large mass, or fill the required space in an ice-house or other room, the object being economy of time and labor in filling an ice-house.

The operation of my devices includes, first, cooling the water to near the freezing-point by conducting it along pipes, spouts, or troughs, or other sloping or horizontal conductors; and then, second, letting it fall in regulated quantities along poles, boards, or other vertical conductors, or directly from the outlets of a trough, to the floor of the storing-place (as a common ice-house or refrigerating-room) until the place is filled with ice. I let the water fall in various ways—as, first, by conducting it near the freezing-point to the top of the house in pipes B, and there distributing it in troughs C or horizontal pipes B' over part or the whole area of said place, and letting it escape in judicious or regulated quantities at several points, *m m f i*, simultaneously, down poles D, ropes, cords, or similar conductors, to the floor, freezing it as it runs, so as to form a system of stalactitic or stalagmitic ice columns, or union of both, at regular intervals throughout the house, which, by continuous accretion, at last coalesce one with another, and, together with the horizontal accumulation of ice on the floor, (deposited from superfluous water from the ice columns,) form a solid mass of ice throughout said house, so filling it. The concentration of several jets of water upon each pole or column nucleus, from all sides, much hastens the process.

As objection may be made to the wooden poles or ropes frozen into the mass, I also employ in their place a straight pipe or series of pipes, D', closed at top and bottom to keep out water, which, after serving as nuclei or conductors, can be charged with steam or hot water to loosen them from the ice, and then be withdrawn.

In combination with this method of forming ice upon several nuclei or ice columns, the water may be allowed to trickle or flow from pipes or spouts along the whole length of the inclosing-walls, and down the latter, so as to coat them with a continually-thickening mass of ice by moving or extending the fall of water forward, at judicious intervals from one or from all sides, until the house is filled.

The water employed may be forced to the top of the house from water-works conveniently, or from a bluff or hill, by a direct fall into the house, or by means of spouts or perforated troughs, so as to produce an accretion of ice at several points at once, and also simultaneous strata at the floor. In the latter case, (forming ice by horizontal deposit, see Fig. 5,) the walls may be raised, successively or continuously, with the rise of the strata of blocks of ice, blocks of ice set in snow, or the interstices so filled, or hardened snow alone, or ice and hardened snow, or even a successive application of boards around the ice-space; in either case closing the leaking interstices with snow, which, soon solidifying, form a sufficient water-barrier. When a sufficient mass is thus obtained the whole may be covered from the weather at leisure. (See Fig. 5.)

By these plans ice may be formed in cool regions in winter immediately within the necessary transporting boats or cars and can thus be forwarded without rehandling.

I fill cooling-rooms or refrigerating-warehouses with ice, (and ice-houses so as to inclose provisions in air-tight recesses, in chests, boxes, or other coverings, or without, during the deposit of the ice (very conveniently) by this system, leaving obvious marks or guides, (as gaged rods, &c.,) to mark the depth or distance of each of the articles from the top or sides of the ice mass, and cut them out for use, as well as take out the ice in proper-sized blocks for sale, &c., by means of saws or a pipe, G, bent into the requisite form, heated by steam, and sunk into the mass of ice until the desired box of provisions is reached, or the desired ice-block is obtained. The provisions, as before said, may be in boxes, or be placed in an inclosed space at a known place within the ice, and a passage, e, left for access, which may be reclosed by ice, as before.

Cooling-rooms E, having floors, walls, and ceiling of ice, may be constructed by this process, inclosing provisions, &c., and covered with boards, with sawdust linings, or other non-conducting guards E.

In the drawings, A is the ice-house, which should have double walls and the usual apertures a for getting at the ice at different heights, and tolerably water-tight floor and walls, and roof A'. B represents the water-supply pipe, discharging into the cooling-trough C, from whence, when near freezing-point, it is distributed immediately to the floor by faucets i f, or immediately by means of the standards or freezing-conductor D' D, &c., rising from the floor as nuclei for formation of ice columns; otherwise the house is filled by conducting water in pipes B' B', (or as many others as is deemed necessary to hasten the process,) and letting the water trickle from the apertures m m, and in the lower surface of these onto the top of said standards D. E represents the cooling-room for provisions; e, passage to it; l, ventilator. F, Fig. 4, is a block of ice or mass in process of being cut by means of an iron steam-pipe, G, with rubber-hose connections g g.

What I claim as my invention is—

1. In an ice-house or other room, the combination of a series of poles or conductors, which are removable after formation of ice about them, with a water-supply pipe, substantially as and for the purpose set forth.

2. The combination of the water-supply pipe B, trough C, having outlets i f, and poles or conductors D, substantially as set forth.

3. The combination of a series of pipes with a water-supply pipe, whereby the said pipes can be filled with a thawing agent, and thus loosened so that they can be readily withdrawn from the ice, substantially as set forth.

4. The combination of a pipe with flexible tubes for the reception of the thawing agent, whereby a mass of ice may be severed, substantially as set forth.

5. The combination, with an ice-house, of an interior apartment, E, for provisions, surrounded with a solid mass of natural ice, and having a ventilator, l, and passage-way e, substantially as set forth.

In testimony that I claim the foregoing system of forming ice for ice-houses, &c., I have hereunto set my hand this 20th day of November, A. D. 1875.

THOMAS B. McFADDEN.

Witnesses:
JAMES M. MORSE,
H. W. WELLS.